United States Patent
Ishiyama (10) Patent No.: US 7,034,813 B2
(45) Date of Patent: Apr. 25, 2006

(54) ELECTRODE DRIVING APPARATUS AND ELECTRONIC EQUIPMENT

(75) Inventor: Hisanobu Ishiyama, Chino (JP)

(73) Assignee: Seiko Epson Corporation, (JP)

( * ) Notice: Subject to any disclaimer, the term of this patent is extended or adjusted under 35 U.S.C. 154(b) by 505 days.

(21) Appl. No.: 10/123,865

(22) Filed: Apr. 16, 2002

(65) Prior Publication Data

US 2002/0167508 A1 Nov. 14, 2002

(30) Foreign Application Priority Data

Apr. 19, 2001 (JP) ............................. 2001-120503

(51) Int. Cl.
*G09G 5/00* (2006.01)

(52) U.S. Cl. .................. 345/205; 345/87; 349/149

(58) Field of Classification Search .................. 345/87,
345/103, 211, 76, 88, 90, 92, 96, 98, 204,
345/205, 206; 349/139, 149, 150, 151, 152,
349/153

See application file for complete search history.

(56) References Cited

U.S. PATENT DOCUMENTS

| | | | | |
|---|---|---|---|---|
| 4,687,300 A | * | 8/1987 | Kubo et al. .................. | 349/151 |
| 5,016,986 A | * | 5/1991 | Kawashima et al. ........ | 349/138 |
| 5,712,493 A | * | 1/1998 | Mori et al. .................... | 257/59 |
| 5,741,315 A | * | 4/1998 | Lee et al. ...................... | 607/60 |
| 6,300,997 B1 | * | 10/2001 | Saito et al. .................. | 349/149 |

FOREIGN PATENT DOCUMENTS

| | | |
|---|---|---|
| JP | 06-034987 | 2/1994 |
| JP | 07-049657 | 2/1995 |
| JP | 09-311341 | 12/1997 |
| JP | 2000-221534 | 8/2000 |
| JP | 2000-286808 | 10/2000 |
| JP | 2001-005403 | 1/2001 |
| JP | 2001-036080 | 2/2001 |
| JP | 2001-091967 | 4/2001 |
| JP | 2002-244580 | 8/2002 |

OTHER PUBLICATIONS

Examination result from corresponding Japanese Application No. 2001-120503.
Communication from Chinese Patent Office re: counterpart application.
Communication from Korean Patent Office re: counterpart application.
Communication from Japanese Patent Office Re: counterpart application.

* cited by examiner

Primary Examiner—Xiao Wu
Assistant Examiner—Jean Lesperance
(74) Attorney, Agent, or Firm—Harness, Dickey & Pierce, P.L.C.

(57) ABSTRACT

An electrode driving apparatus includes first and second substrates 11 and 12, first and second electrode patterns 21 and 22 arranged in a quadrilateral region 20, first and second wiring patterns 31 and 32, a first electronic component 40 that is electrically connected to the first wiring pattern 31, and a second electronic component 50 that is electrically connected to the second wiring pattern 32. The first and second electronic components 40 and 50 are disposed outside and on the side of a first side 24 of the quadrilateral region 20.

16 Claims, 6 Drawing Sheets

ELECTRODE DRIVING APPARATUS AND ELECTRONIC EQUIPMENT

BACKGROUND OF THE INVENTION

1. Technical Field of the Invention

The present invention relates to electrode driving apparatuses and electronic equipment.

2. Background Technology

Figure 9:
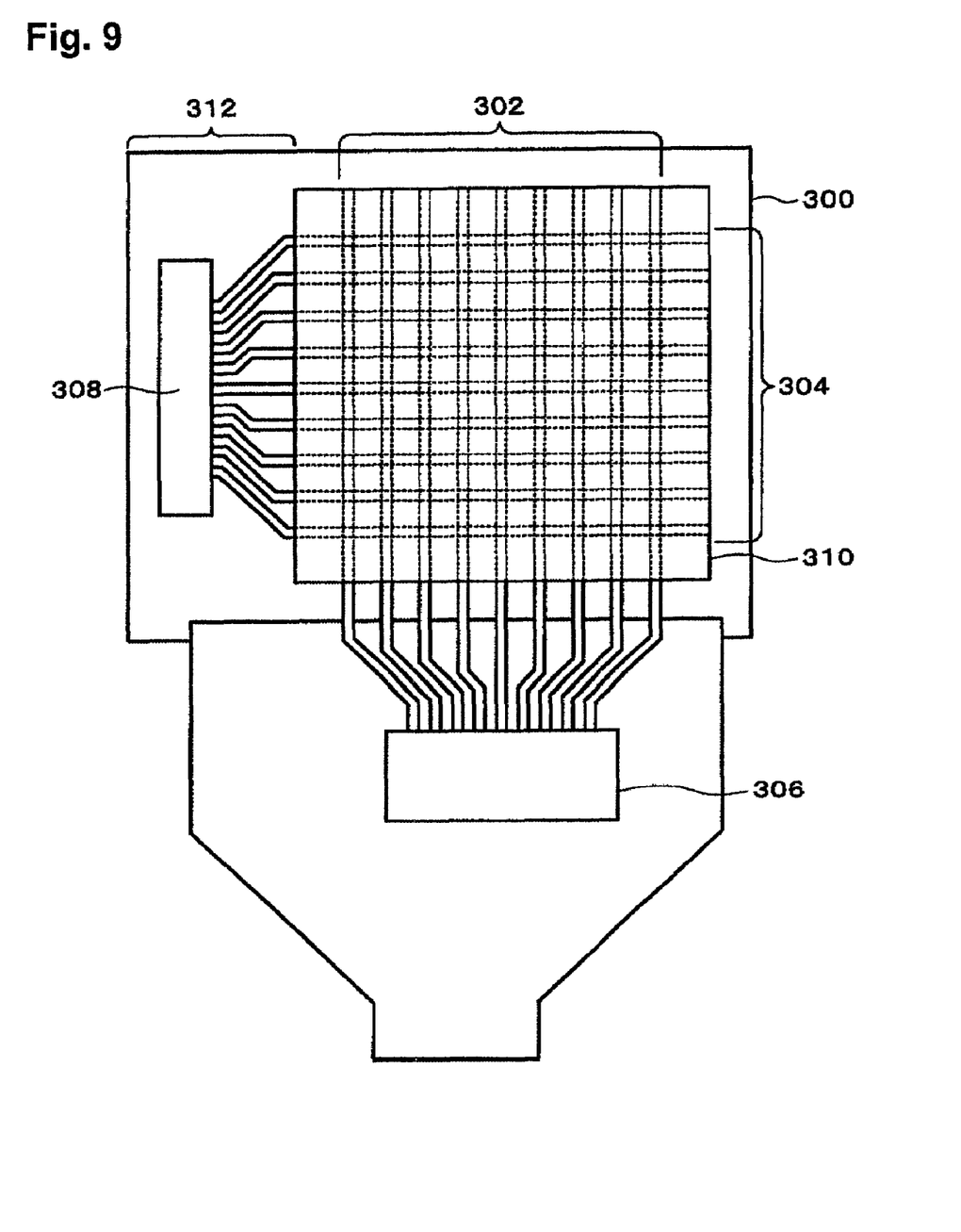
FIG. 9 shows a liquid crystal display apparatus of a conventional technology.

FIG. 9 shows a liquid crystal display apparatus of a conventional technology. In a liquid crystal display apparatus 300 of an active matrix type, signal electrodes 302 and scanning electrodes 304 are formed in a manner to cross one another. The liquid crystal display apparatus 300 includes an X driver (source driver) 306 that supplies driving signals to the signal electrodes 302, and a Y driver (gate driver) 308 that supplies driving signals to the scanning electrodes 304.

The X driver 306 is capable of operating with miniaturized wirings and at a low voltage due to the necessity to increase the circuit density resulting from the miniaturization and coloring of display images pursued in recent years. In the mean time, the Y driver 308 provides a higher driving voltage than that of the X driver 306, and therefore has a structure to withstand high voltages.

Accordingly, the X driver 306 and the Y driver 308 may be composed by independent electronic components, and may often be disposed separately from one another. In such a case, for example, as shown in FIG. 9, when the X driver 306 is disposed below a first side of a liquid crystal panel 310 and the Y driver 308 is disposed on the side of a second side of the liquid crystal panel 310, the liquid crystal display apparatus 300 becomes large in lateral and vertical directions. In particular, as shown in FIG. 9, when a frame region 312 becomes broad, a liquid crystal display apparatus that is small in width, which is required for a mobile telephone, cannot be provided. Such problems may occur not only in the liquid crystal display apparatuses but also when driving crisscrossing electrodes.

The present invention solves the problems, and its object is to provide an electrode driving apparatus and electronic equipment that can reduce its width (in other words, its frame).

SUMMARY OF THE INVENTION

An electrode driving apparatus in accordance with the present invention comprises:
first and second substrates;
first and second electrode patterns arranged in a quadrilateral region between the first and second substrates;
a first wiring pattern electrically connected to the first electrode pattern and formed outwardly from a first side of the quadrilateral region;
a second wiring pattern electrically connected to the second electrode pattern and formed outwardly from a second side adjacent to the first side of the quadrilateral region;
a first electronic component electrically connected to the first wiring pattern; and
a second electronic component electrically connected to the second wiring pattern,
wherein the first and second electronic components are disposed outside the quadrilateral region and on a side of the first side.

By the present invention, since the first and second electronic components are disposed on the side of the first side, the space on the side of the second side (the width in this direction) can be made smaller.

(2) In the electrode driving apparatus, the first and second electrode patterns may be formed in a manner to cross one another.

(3) In the electrode driving apparatus, the quadrilateral region may be a region that is defined by one of the outer shapes of the first and second substrates.

(4) In the electrode driving apparatus, a third substrate that is attached to one of the first and second substrates may be further provided, and the first and second electronic components may be provided on the third substrate, and at least a part of each of the first and second wiring patterns may be formed on the third substrate.

(5) In the electrode driving apparatus, wherein two sides adjacent to both ends of the first side may be the second sides, respectively, and the second wiring pattern may be formed from each of the two sides.

(6) In the electrode driving apparatus, the second electronic component may be rectangular, and the second wiring pattern may be electrically connected to each of the two ends in a direction along the longer sides thereof.

(7) In the electrode driving apparatus, the first electronic component may be disposed in a region surrounded by the second patterns formed respectively from the two sides, the second electronic component and the quadrilateral region.

(8) In the electrode driving apparatus, the second electronic component may have a connection terminal provided at an end section thereof on the side of the surrounded region, and an external terminal provided on an end section thereof on the outside of the surrounded region, and a connection pattern that electrically connects the connection terminal and the first electronic component may be further provided.

(9) In the electrode driving apparatus, the second electronic component may have an internal path through which at least one of a signal and a power supply passes between the external terminal and the connection terminal.

(10) In the electrode driving apparatus, a common voltage $V_{COM}$ may pass as the power supply through the path.

(11) In the electrode driving apparatus, there may further be provided a third wiring pattern that passes below the second electronic component and electrically connects to the first electronic component, through which at least one of a signal and a power supply passes.

(12) In the electrode driving apparatus, a face-down mounting may be applied to the second electronic component, and the third wiring pattern may be formed in a manner to avoid bumps of the second electronic component.

(13) In the electrode driving apparatus, wherein the second electronic component may have a power supply circuit.

(14) In the electrode driving apparatus, an electrooptic material may be provided between the first substrate and the second substrate to compose an electrooptical apparatus.

(15) In the electrode driving apparatus, the electrooptic material may be liquid crystal to compose a liquid crystal apparatus.

(16) In the electrode driving apparatus, the first electrode may be a signal electrode, and the first electronic component may have a display control function.

(17) In the electrode driving apparatus, the signal may be a control signal for the first electrode.

(18) An electronic equipment in accordance with the present invention comprises the electrode driving apparatus set forth above.

DETAILED DESCRIPTION OF THE PREFERRED EMBODIMENTS OF THE PRESENT INVENTION

Embodiments of the present invention will be described below with reference to the accompanying drawings.

(First Embodiment)

Figure 1:
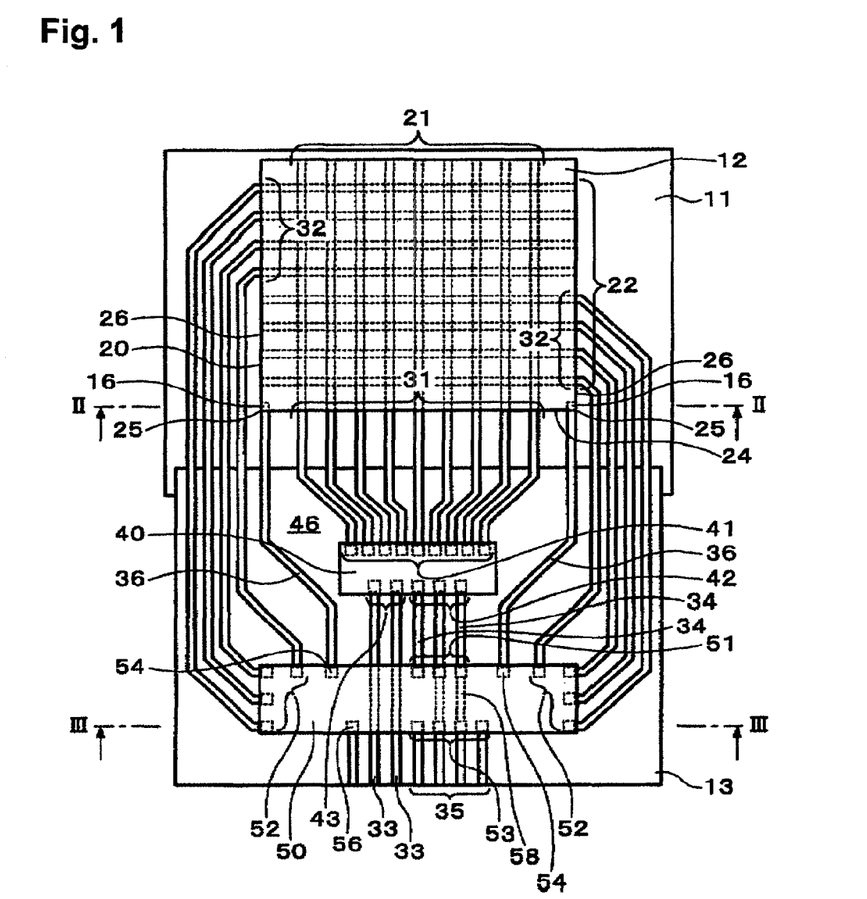
FIG. 1 shows an electrode driving apparatus in accordance with a first embodiment of the present invention.
Figure 2:
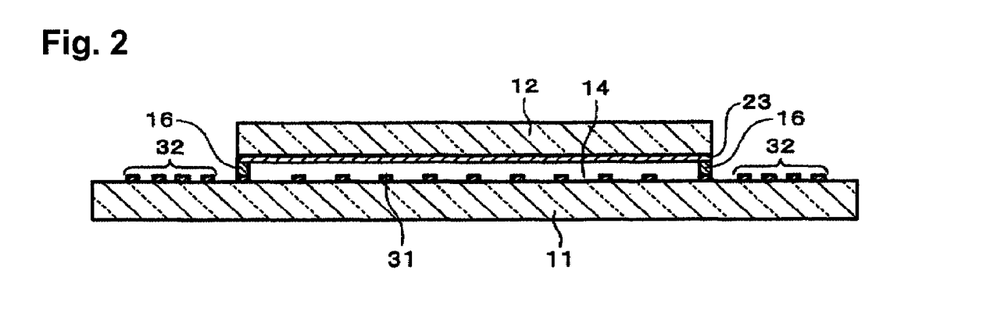
FIG. 2 shows a cross-sectional view taken along lines II—II of FIG. 1.
Figure 3:
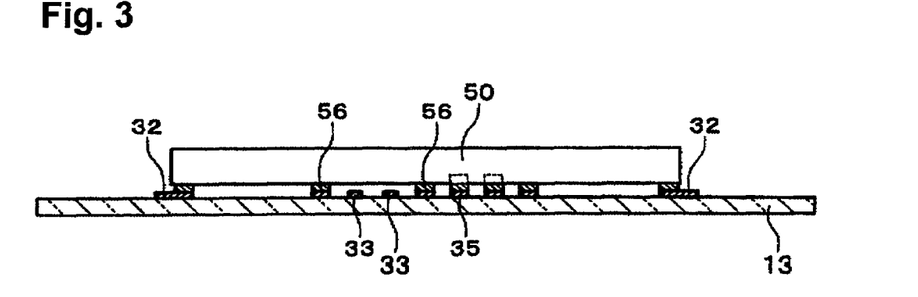
FIG. 3 shows a cross-sectional view taken along lines III—III of FIG. 1.

FIG. 1 shows an electrode driving apparatus in accordance with a first embodiment of the present invention. FIG. 2 shows a cross-sectional view taken along lines II—II of FIG. 1, and FIG. 3 shows a cross-sectional view taken along lines III—III of FIG. 1.

The electrode driving apparatus has a first substrate 11. A second substrate 12 is provided opposite to the first substrate 11. At least one of the first and second substrates 11 and 12 (only one or both of them) is a transparent substrate that is formed from glass or the like. The first and second substrates 11 and 12 are formed from electrically insulating material at least on their surfaces. The first and the second substrates 11 and 12 are not limited to a quadrilateral shape (including a rectangular shape). In the present embodiment, the first substrate 11 is larger than the second substrate 12.

In the present embodiment, the electrode driving apparatus includes a third substrate 13. The third substrate 13 is connected to the first substrate 11. A flexible substrate (film) may be used as the third substrate 13.

The electrode driving apparatus includes a first electrode pattern 21. The first electrode pattern 21 shown in FIG. 1 is formed from a plurality of electrodes extending in an up-and-down direction in the figure. In an active matrix type liquid crystal apparatus, the first electrode pattern 21 composes signal electrodes (or scanning electrodes). The electrode driving apparatus includes a second electrode pattern 22. The second electrode pattern 22 shown in FIG. 1 is formed from a plurality of electrodes extending in a left-to-right direction in the figure. In an active matrix type liquid crystal apparatus, the second electrode pattern 22 composes scanning electrodes (or signal electrodes). An active matrix type liquid crystal apparatus has pixel electrodes (not shown), and electrical connections of the signal electrodes and the pixel electrodes are turned on and off by active elements (for example, transistors) that are controlled through the scanning electrodes.

The first and second electrode patterns 21 and 22 may be formed in a manner to crisscross one another, for example in a matrix. In the present embodiment, the first and second electrode patterns 21 and 22 are formed in the first substrate 11. The first and second electrode patterns 21 and 22 are arranged in a quadrilateral region 20. In the example shown in FIG. 1, the quadrilateral region 20 is a region that is defined by an outer shape of the quadrilateral second substrate 12. A part of each of the first and second electrode patterns is also formed in the third substrate 13.

The electrode driving apparatus has a third electrode pattern 23, as shown in FIG. 2. The third electrode pattern 23 is formed in the second substrate 12. In an active matrix type liquid crystal apparatus, the third electrode pattern 23 composes common electrodes. In this case, the third electrode pattern 23 is formed on a surface of the second substrate 12 on the side of the first substrate 11.

In the present embodiment, the electrode driving apparatus is an electrooptical apparatus (e.g., a liquid crystal apparatus, plasma display apparatus, electroluminescence display apparatus or the like), wherein an electrooptic material (e.g., liquid crystal, discharge gas, luminous material or the like) 14 is provided between the first and second substrates 11 and 12. The electrooptic material 14 is sealed by a sealing material (not shown). The electrode driving apparatus may be an electrode driving panel. The electrode driving panel may be an electrooptical panel (e.g., a liquid crystal panel, plasma display panel, electroluminescence display panel or the like).

The electrode driving apparatus has a first wiring pattern 31. The first wiring pattern 31 may be formed from a plurality of wirings. The first wiring pattern 31 is electrically connected to the first electrode pattern 21. The plurality of electrodes that compose the first electrode pattern 21 may be electrically connected to the respective plurality of wirings that compose the first wiring pattern 31. The first electrode pattern and the first wiring pattern 21 and 31 may be continuously formed in one piece. The first wiring pattern 31 is formed extending outwardly from a first side 24 of the quadrilateral region 20.

The electrode driving apparatus has a second wiring pattern 32. The second wiring pattern 32 may be formed from a plurality of wirings. The second wiring pattern 32 is electrically connected to the second electrode pattern 22. The plurality of electrodes that compose the second electrode pattern 22 may be electrically connected to the respective plurality of wirings that compose the second wiring pattern 32. The second electrode pattern and the second wiring pattern 22 and 32 may be continuously formed in one piece. The second wiring pattern 32 is formed extending outwardly from a second side 26 of the quadrilateral region 20. The second side 26 is adjacent to the first side 24. In the present embodiment, the second wiring pattern 32 is formed extending from each of the two second sides 26 that are adjacent to both ends of the first side 24.

The electrode driving apparatus has first and second electronic components 40 and 50. The first electronic component 40 drives the first electrode pattern (for example, signal electrodes) 21, and may be equivalent to an X driver or a source driver. The first electronic component 40 may have a display control function, and may include a RAM mounted therein. The second electronic component 50 drives the second electrode pattern (for example, scanning electrodes) 22, and may be equivalent to a Y driver or a gate driver. The second electronic component 50 may include a power supply circuit, an oscillation circuit or the like mounted therein.

In the present embodiment, the first and second electronic components 40 and 50 are disposed outside the quadrilateral region 20, and on the side of the first side 24. In other words, the first and second electronic components 40 and 50 are disposed opposite to the first side 24 but in a manner not to be opposite to the second side 26. For example, the third substrate 13 is provided on the side of the first side 24, and the first and second electronic components 40 and 50 are provided on the third substrate 13. By disposing them in this manner, the space on the side of the second side 26 can be made smaller.

The first and second electronic components 40 and 50 shown in FIG. 1 are peripheral type parts, and have multiple terminals arranged on their end sections. The first and second electronic components 40 and 50 may be mounted by a TAB (Tape Automated Bonding) method, but are mounted by a facedown mounting method in the present embodiment. They are called as a COF (Chip On Film) when the substrate on which they are to be mounted (the third substrate 13 in the example shown in FIG. 1) is a film, and a COG (Chip On Glass) when the substrate is glass. A TCP (Tape Carrier Package) may be formed with the first and second electronic components 40, 50 and the substrate (the third substrate 13 in the example shown in FIG. 1).

At least one first terminal 41 (plural terminals in the example shown in FIG. 1) that is electrically connected to the first wiring pattern 31 is provided in the first electronic component 40. The first wiring pattern 31 is formed in a region between the first electrodes 21 and the first electronic component 40.

At least one second terminal 52 (plural terminals in the example shown in FIG. 1) that is electrically connected to the second wiring pattern 32 is provided in the second electronic component 50. The second electronic component 50 shown in FIG. 1 is oblong, and has second terminals 52 on both end sections of the longer sides thereof. Further, the second wiring pattern 32 is electrically connected to each of the both end sections along the longer sides of the second electronic component 50.

In the present embodiment, the first electronic component 40 is disposed in a region 46 that is surrounded by the second wiring patterns 32 formed extending from the both sides of the quadrilateral region 40 (the two second sides 26 adjacent to both ends of the first side 24), the second electronic component 50, and the quadrilateral region 20. The electrode driving apparatus has a third wiring pattern 33 and a path 58 in order to supply at least one of a signal (for example, a control signal for the first electronic component 40) and a power supply (including GND) to the first electronic component 40 from outside of the region 46.

The third wiring pattern 33 passes below the second electronic component 50, as shown in FIG. 3, and is electrically connected to third terminals 43 provided in the first electronic component 40. Also, the third wiring pattern 33 is formed in a manner to avoid bumps 56 of the second electronic component 50. In other words, the bumps 56 are not formed over the third wiring pattern 33. Accordingly, the third wiring pattern 33 does not electrically contact the second electronic component 50. Also, a gap is provided between the third wiring pattern 33 and the second electronic component 50 to avoid physical contacts between them. By doing so, a surface of the second electronic component 50 in which active elements are formed is protected. The third wiring pattern 33 may be formed from a plurality of wirings.

The path 58 is formed inside the second electronic component 50. The second electronic component 50 has a plurality of external terminals 53 on an end section thereof on the outside of the region 46 described above. The external terminals 53 are terminals for connecting to an exterior of the electrode driving apparatus. The external terminals 53 are electrically connected to a fifth wiring pattern 35. The second electronic component 50 has a plurality of connection terminals 51 at an end section thereof on the side of the region 46 described above. A path 58 is formed between at least one of the external terminals 53 and at least one of the connection terminals 51. The path 58 is a wiring that does not have an active element. The connection terminal 51 that is connected to the path 58 is electrically connected to the connection terminal 42 of the first electronic component 40 by a fourth wiring pattern (a connection terminal pattern) 34.

The second electronic component 50 generates a voltage (common voltage $V_{COM}$) that is applied to the third electrode pattern (common electrodes) 23, and outputs the same from the output terminal 54. The output terminal 54 is electrically connected to a sixth wiring pattern 36, and the sixth wiring pattern 36 is electrically connected to the third electrode pattern 23.

Figure 4:
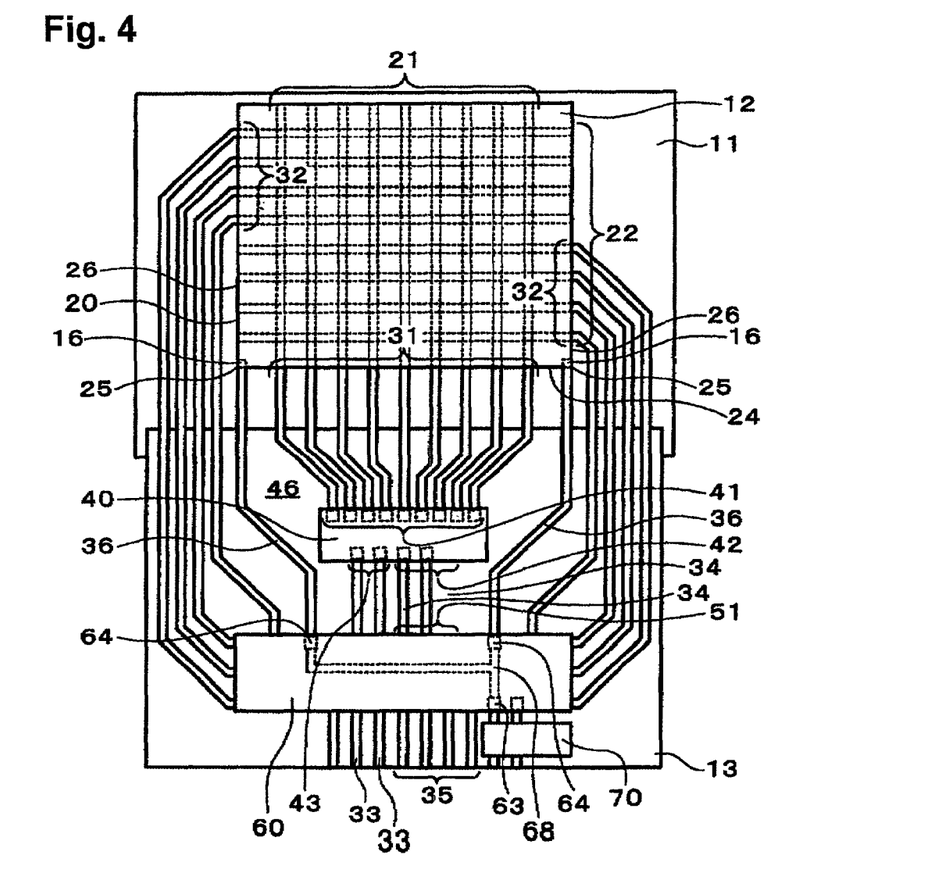
FIG. 4 shows a variation example of the electrode driving apparatus in accordance with the first embodiment.

Alternatively, as shown in FIG. 4, the second electronic component 60 may have a path 68 in its interior that passes the common voltage $V_{COM}$. For example, the common voltage $V_{COM}$ may be generated by a third electronic component 70. The third electronic component 70 is disposed on the outside of the second electronic component 60 and the second wiring pattern 32 (outside of the region 46). The path 68 may be provided with a circuit layout or a wiring layout that withstands a high voltage such that a signal of a higher voltage than the power supply voltage (for example, 1.8 V, 3 V) of the second electronic component 60 can pass. As a result, the path 68 can pass a power supply voltage such as a common voltage $V_{COM}$ (for example, −1.0~4.0 V with an amplitude of 5 V). The common voltage $V_{COM}$ that is generated by the third electronic component 70 is inputted in the external terminal 63 of the second electronic component 60, passes through the path 68, and outputted from the output terminal 64. Then, it passes through the sixth wiring pattern 36 that is electrically connected to the output terminal 64, and inputted in the third electrode pattern 23 (see FIG. 2).

The sixth wiring pattern 36 is formed extending from an apex 25 that is formed by the first and second sides 24 and 26 or an area adjacent thereto. In other words, the sixth wiring pattern 36 is formed in a position closer to the apex 25 than positions of the first and second wiring patterns 31 and 32 to the apex. The sixth wiring pattern 36 is formed outwardly extending from the quadrilateral region 20. The sixth wiring pattern 36 shown in FIG. 1 is composed of one wiring, but may be composed of a plurality of wirings. Also, the sixth wiring pattern 36 is electrically connected to the third electrode pattern 23 through an electrically conductive section 16.

The first, second and sixth wiring patterns 31, 32 and 36 are formed in the first substrate 11. In the present embodiment, the first, second and sixth wiring patterns 31, 32 and 36 are also formed in the third substrate 13. For example, a plurality of wiring patterns formed in the first substrate 11 may be connected to a plurality of wiring patterns formed in the third substrate 13 to thereby form the first, second and sixth wiring patterns 31, 32 and 36. By the connection, metal bonding may be employed, or an anisotropic electrical conduction material may be used.

By the electrode driving apparatus in accordance with the present embodiment, the spaces on the sides of the second sides 26 of the quadrilateral region 20 can be made smaller, and therefore the width along such direction can be made smaller. Also, if the second electronic component 50 is provided with an internal power supply circuit to thereby supply a necessary voltage to the first electronic component 40, the first electronic component 40 can be made smaller as its power supply circuit can be omitted.

Next, an operation of the electrode driving apparatus in accordance with one embodiment of the present invention will be described. A signal or a power supply from an exterior is inputted in the second electronic component 50 through the fifth wiring pattern 35. Also, the external signal or the power supply passes at least one of the third wiring pattern 33 and the path 58, and is inputted in the first electronic component 40. When a necessary voltage or signal is generated in the second electronic component 50, the same passes through the fourth wiring pattern (connection pattern) 34 and is inputted in the first electronic component 40. The first electronic component 40 drives the first electrode pattern (signal electrodes) 21, and the second electronic component 50 drives the second electrode pattern (scanning electrodes) 22. A voltage (common voltage $V_{COM}$) that is outputted from the second electronic component 50 is applied to the third electrode pattern 23.

(Second Embodiment)

Figure 5:
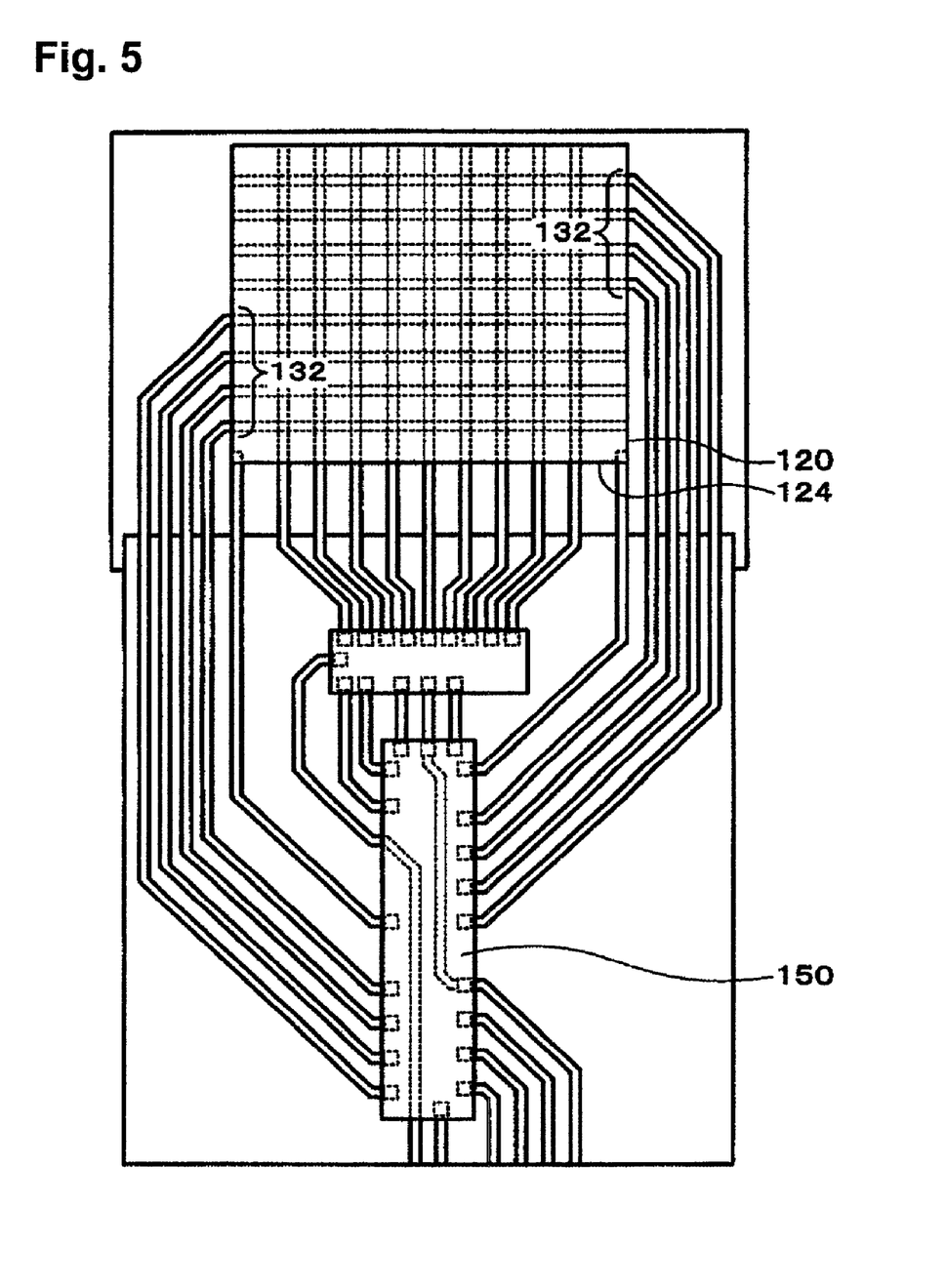
FIG. 5 shows an electrode driving apparatus in accordance with a second embodiment of the present invention.

FIG. 5 shows an electrode driving apparatus in accordance with a second embodiment of the present invention. In this embodiment, the orientation of a second electronic component 150 is different from the orientation of the second electronic component 50 in the first embodiment. In other words, the second electronic component 150 is oblong, and its longer sides are disposed in a manner to extend in a direction that traverses a first side 124 of a quadrilateral region 120. Also, in association with disposing the second electronic component 60 in this manner, second wiring patterns 132 are electrically connected to both ends of the second electronic component 150 in a direction of shorter sides thereof (i.e., end sections that form longer sides thereof). The details described above in the first embodiment apply to the other structures and effects.

(Third Embodiment)

Figure 6:
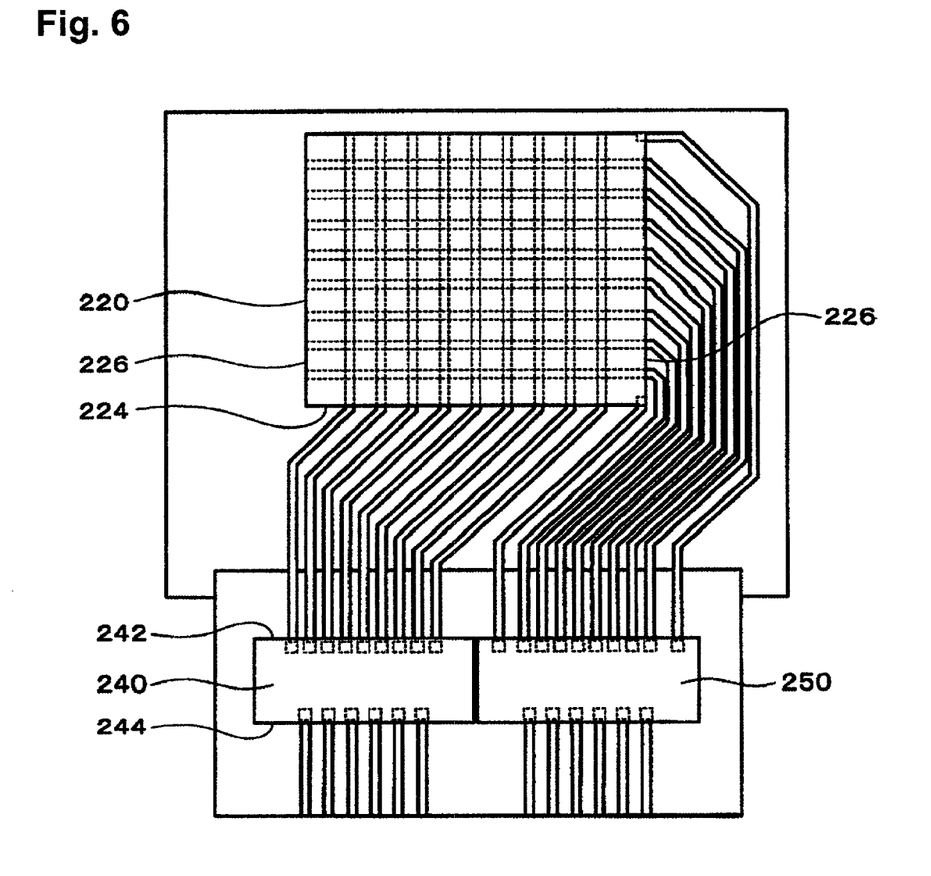
FIG. 6 shows an electrode driving apparatus in accordance with a third embodiment of the present invention.

FIG. 6 shows an electrode driving apparatus in accordance with a third embodiment of the present invention. In this embodiment, a second electronic component 250 is disposed in a location different from that of the second electronic component 50 in the first embodiment. In other words, in the first embodiment, the first electronic component 40 is disposed between the quadrilateral region 20 and the second electronic component 50. However, this positional relation is not employed in the present embodiment. The second electronic component 250 is disposed shifted from a first electronic component 240 along a first side 224 of a quadrilateral region 220. The second electronic component 250 is disposed in a manner to avoid a side 244 of the first electronic component 240, which is on the opposite side of a side 242 thereof that is opposite to the first side 224. In the example shown in FIG. 6, the first and second electronic components 240 and 250 are disposed such that their longer sides extend in a direction along the first side 224. However, they may be disposed such that their shorter sides extend in that direction. In the present embodiment also, the first and second electronic components 240 and 250 are disposed on the side of the first side 224. Here, "on the side of the first side 224" means an opposite side of a second side 226 about the first side 224 as a boundary. Therefore, a region in which the first and second electronic components 240 and 250 are disposed may be longer than the length of the first side 224. This is also applicable to the other embodiments.

Figure 7:
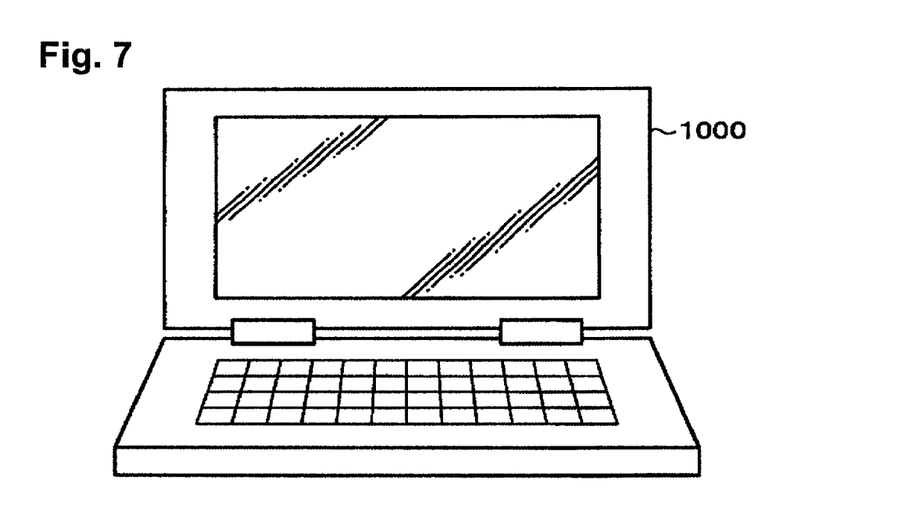
FIG. 7 shows electronic equipment in accordance with one embodiment of the present invention.
Figure 8:
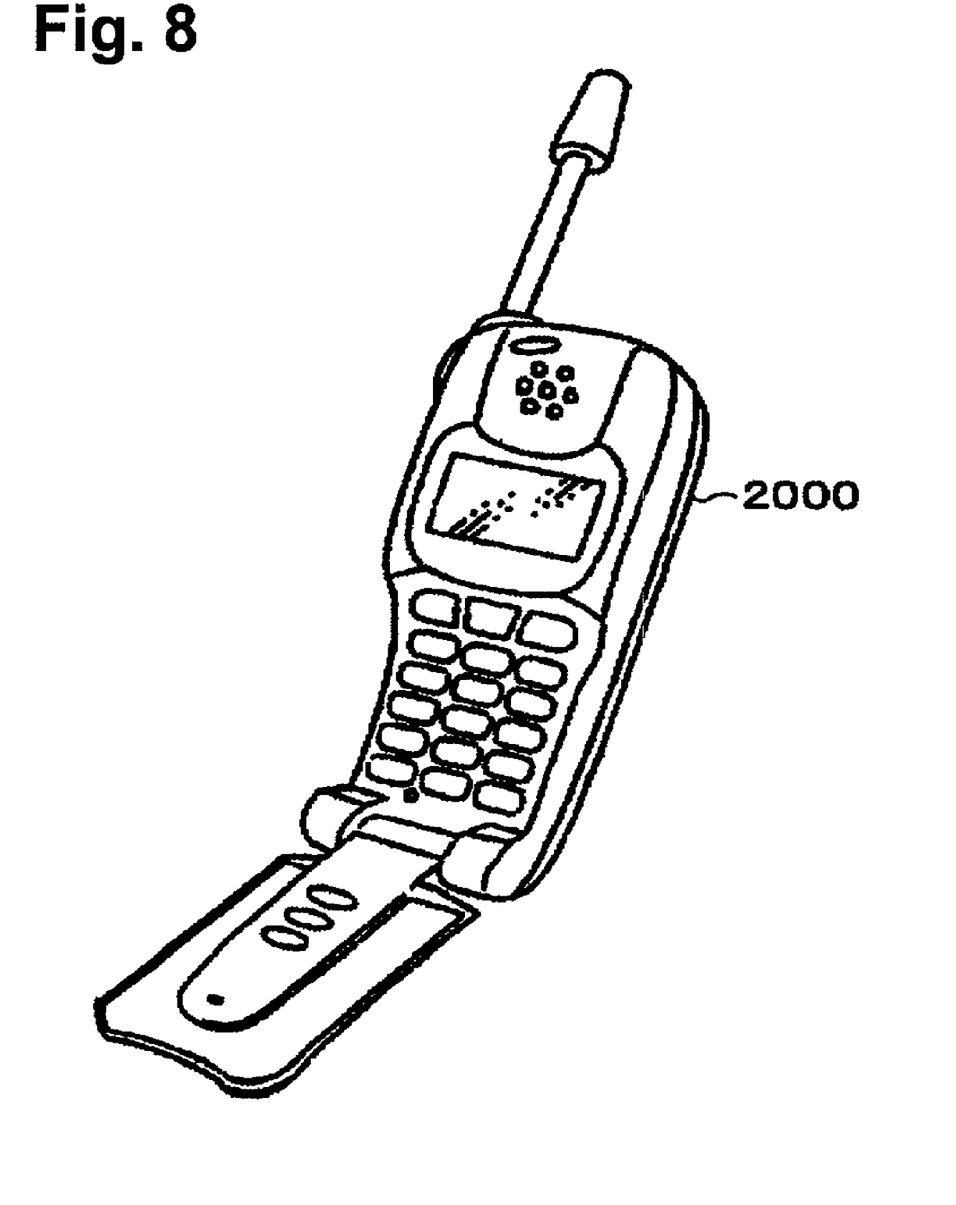
FIG. 8 shows electronic equipment in accordance with one embodiment of the present invention.

The details described in the first embodiment apply to the other structures and effects. The present invention does not exclude these embodiments. As electronic equipment that has an electrode driving apparatus in accordance with any one of the embodiments described above, FIG. 7 shows a notebook type personal computer 1000, and FIG. 8 shows a mobile telephone 2000.

The present invention is not limited to the embodiments described above, and many modifications can be made. For example, the present invention includes structures that are substantially the same as the structures in the embodiments described above (for example, a structure having the same function, method and result, or a structure having the same object and results). Also, the present invention includes structures in which portions of the structures in the embodiments described above that do not constitute essential parts may be replaced. Also, the present invention includes structures that achieve the same functions and effects as those of the structures in the embodiments described above, and structures that achieve the same objects. Also, the present invention includes structures in which prior art is added to the structures in the embodiment described above. The entire disclosure of Japanese Patent Application No. 2001-120503 filed Apr. 19, 2001 is incorporated by reference.

The invention claimed is:

1. An electrode driving apparatus comprising:
   first and second substrates;
   first and second electrode patterns arranged in a quadrilateral region between the first and second substrates;
   a first wiring pattern electrically connected to the first electrode pattern and formed outwardly from a first side of the quadrilateral region;
   a second wiring pattern electrically connected to the second electrode pattern and formed outwardly from a second side adjacent to the first side of the quadrilateral region;
   two sides adjacent to both ends of the first side are the second sides and the second wiring pattern is formed from each of the two sides;
   a first electronic component electrically connected to the first wiring pattern; and
   a second electronic component electrically connected to the second wiring pattern;
   wherein the first and second electronic components are disposed outside the quadrilateral region and on a side of the first side;
   wherein the first electronic component is completely surrounded by the second wiring pattern, the second electronic component, and the quadrilateral region.

2. An electrode driving apparatus according to claim 1, wherein the first and second electrode patterns are formed in a manner to cross one another.

3. An electrode driving apparatus according to claim 1, wherein the quadrilateral region is a region that is defined by an outer shape of one of the first and second substrates.

4. An electrode driving apparatus according to claim 1, further comprising:
   a third substrate that is attached to one of the first and second substrates,
   wherein the first and second electronic components are provided on the third substrate, and
   at least a part of each of the first and second wiring patterns is formed on the third substrate.

5. An electrode driving apparatus according to claim 1, wherein the second electronic component is rectangular, and the second wiring pattern is electrically connected to each of said both ends in a direction along a longer side thereof.

6. An electrode driving apparatus according to claim 1, wherein the second electronic component has a connection terminal provided at an end section thereof on the side of the surrounded region, and an external terminal provided on an end section thereof on the outside of the surrounded region, and further comprising a connection pattern that electrically connects the connection terminal and the first electronic component.

7. An electrode driving apparatus according to claim 6, wherein the second electronic component has an internal path through which at least one of a signal and a power supply passes between the external terminal and the connection terminal.

8. An electrode driving apparatus according to claim 7, wherein a common voltage $V_{com}$ passes as the power supply through the path.

9. An electrode driving apparatus according to claim 1, further comprising a third wiring pattern that passes below the second electronic component and electrically connects to the first electronic component, through which at least one of a signal and a power supply passes.

10. An electrode driving apparatus according to claim 9, wherein a face-down mounting is applied to the second electronic component, and the third wiring pattern is formed in a manner to avoid bumps of the second electronic component.

11. An electrode driving apparatus according to claim 1, wherein the second electronic component has a power supply circuit.

12. An electrode driving apparatus according to claim 1, wherein an electrooptic material is provided between the first substrate and the second substrate to compose an electrooptical apparatus.

13. An electrode driving apparatus according to claim 12, wherein the electrooptic material is liquid crystal to compose a liquid crystal apparatus.

14. An electrode driving apparatus according to claim 13, wherein the first electrode is a signal electrode, and the first electronic component has a display control function.

15. An electrode driving apparatus according to claim 14, wherein a signal applied to the signal electrode is a control signal for the first electrode.

16. An electronic equipment comprising the electrode driving apparatus set forth in claim 12.

* * * * *